United States Patent
Amend

[11] Patent Number: 5,381,889
[45] Date of Patent: Jan. 17, 1995

[54] CONTAINER FOR CONTACT LENSES AND A RESERVOIR FOR CONTACT LENS FLUID

[76] Inventor: Udo Amend, Märchenring 49, D-76199 Karlsruhe, Germany

[21] Appl. No.: 264,321

[22] Filed: Jun. 23, 1994

[30] Foreign Application Priority Data

Jun. 24, 1993 [EP] European Pat. Off. ............ 93110084

[51] Int. Cl.⁶ .................... A45C 11/04; B08B 3/00
[52] U.S. Cl. ............................ 206/5.1; 134/901
[58] Field of Search ............ 206/38, 205, 210, 37, 206/5.1; 134/901

[56] References Cited

U.S. PATENT DOCUMENTS

| | | |
|---|---|---|
| 3,089,500 | 10/1960 | Stalcup . |
| 3,880,278 | 4/1975 | Brown .................. 206/5.1 |
| 4,228,136 | 10/1980 | Thomas .............. 206/5.1 X |
| 4,707,343 | 11/1987 | Ando .................. 206/5.1 X |
| 4,865,186 | 9/1989 | Gates . |
| 5,156,175 | 10/1992 | Jones .................. 134/901 X |
| 5,167,323 | 12/1992 | Ohta et al. ........... 134/901 X |
| 5,181,604 | 1/1993 | Ohta et al. ........... 134/901 X |

FOREIGN PATENT DOCUMENTS

| | | |
|---|---|---|
| 8904792 | 8/1989 | Germany . |
| 9211087 | 12/1992 | Germany . |
| 90/14028 | 11/1990 | WIPO . |
| 93/09692 | 5/1993 | WIPO . |

*Primary Examiner*—Jacob K. Ackun, Jr.
*Attorney, Agent, or Firm*—Spencer, Frank & Schneider

[57] ABSTRACT

A container for contact lenses and for a supply of contact lens fluid has a base body with a receptacle for a removable contact lens etui, a fluid chamber for the contact lens fluid, which partially encloses the receptacle, and a metering connector fastened on the fluid chamber. A contact lens etui housed in the receptacle can be readily taken out of the container and separately taken along.

3 Claims, 2 Drawing Sheets

CONTAINER FOR CONTACT LENSES AND A RESERVOIR FOR CONTACT LENS FLUID

CROSS REFERENCE TO RELATED APPLICATION

This application claims the priority of European Application No. EU 93 110 084.6 filed Jun. 24, 1993, which is incorporated herein by reference.

FIELD OF THE INVENTION

The invention relates to a container for contact lenses and a reservoir for contact lens fluid.

BACKGROUND OF THE INVENTION

As a rule, wearers of contact lenses must always have the paraphernalia for storing, maintaining, cleaning and disinfecting their contact lenses with them. Besides the container for the contact lenses themselves this includes a substantial supply of contact lens fluid.

Known contact lens containers, such as for example described in U.S. Pat. No. 3,085,500, at most offer space for one or two small removable bottles. A wearer of contact lenses is forced to take along a separate container with contact lens fluid, particularly when he is traveling. However, because of their size the commercially available reservoirs, which customarily are offered as throw-away bottles in large arrangements, are not suited to be taken along constantly.

A combination contact lens container with a removable fluid reservoir has become known from German Utility Model DE 42 12 873.0 U. However, during travel there is the danger that the container for the contact lenses and the reservoir become separated from each other.

U.S. Pat. No. 4,865,186 discloses a combination container in the top part of which a pair of contact lenses can be stored and the lower part of which offers space for glasses. However, this container is not suitable for taking along a supply of contact lens fluid.

OBJECT AND SUMMARY OF THE INVENTION

It is therefore the object of the present invention to conceptualize an improved container, which in a space-saving manner can receive all paraphernalia required by a contact lens wearer securely and protected and beyond that makes possible its simple manipulation.

This object and others to become apparent as the specification progresses, are accomplished by the invention, according to which, briefly stated, the container for contact lenses and a reservoir for contact lens fluid includes a base body in the shape of a rectangular cuboid with a flat front face; a rectangular receptacle accessible from the front face for accommodating a removable contact lens etui; a cross-sectionally L-shaped fluid chamber partly surrounding the receptacle such that the two legs of the L enclose the receptacle; a metering connector disposed on the front face and connected with the fluid chamber; and a covering for the front face.

This container can receive the contact lenses themselves as well as a supply of contact lens fluid. All required paraphernalia are safely stored in a very tight space in a single container which is very well suited for being taken along comfortably. If needed, the separate contact lens etui, which can be embodied to be appropriately small, can be removed from the container. In this way it is possible, for example, to take the contact lens etui along separately during the day and put it back into the container at night. To replace the contact lens fluid, first the contact lens etui is taken out of the receptacle and opened. After this the required amount of contact lens fluid can be taken drop-by-drop from the fluid chamber by means of the metering connector.

The container in accordance with the invention has the shape of a rectangular cuboid with a flat front face, wherein the receptacle is accessible from the front face, the metering connector is disposed on the front face of the fluid chamber and a cover for the front face is provided. In this way all openings required for handling the container are accessible from a single direction and, after having been used, can be closed off again by the protective cover. The closed container has smooth surfaces all around, so that it is very manipulable and at the same time safely protects its contents.

The receptacle is embodied to be rectangular. For example, it is possible to adapt the shape of the receptacle to a contact lens etui in accordance with European Patent Application 92/120 046 of applicant.

The fluid chamber is L-shaped in cross section, wherein the two legs of the L enclose the receptacle. By means of this design the interior of the container, which has the shape of a rectangular cuboid and is intended to receive an also rectangular, but considerably smaller contact lens etui, can be optimally utilized. It is therefore possible to fill the fluid chamber with a maximum amount of fluid.

In a practical further embodiment of the invention a threaded opening with a left-hand interior thread is provided on the front face of the base body. Furthermore, the metering connector is embodied as a twice stepped hollow cylinder, which makes a transition from a first cylinder section to a second cylinder section via a flat support ring. The second cylinder section has a lesser diameter than the first cylinder section. The first cylinder section has a left-hand exterior thread and the second cylinder section a right-hand exterior thread. A closure cap can be screwed on the second cylinder section. Contact lens fluid can be filled into the fluid chamber through the open threaded opening. Subsequently the first cylinder section of the metering connector is screwed into the threaded opening with the left-hand thread until the flat support ring rests against the front face. The outwardly projecting second cylinder section can be closed off by means of the closure cap, which has a right-hand interior thread. If now the closure cap is turned to the left and removed by this, the second cylinder section of the metering connector is exposed and contact lens fluid can be taken out of the fluid chamber. However, the fluid chamber is again tightly closed by applying and screwing the closure cap on the second cylinder section. If after this the closure cap is turned further to the right, the metering connector can be turned out of the threaded opening after a critical torque has been overcome and it finally can be completely removed. Thus the threaded opening which has been exposed represents a refill opening for the fluid chamber. When the refill process has been completed, the threaded opening in the fluid chamber can again be tightly closed by screwing in the metering connector.

The cover is suitably embodied as a cap which can be detached from the base body. In this way the cap can be taken off in the simplest manner and hampers neither the removal of the contact lens etui nor the drop-by-drop withdrawal of contact lens fluid.

The invention will be described in detail by means of the attached drawings.

DETAILED DESCRIPTION OF THE PREFERRED EMBODIMENT

Figure 1:
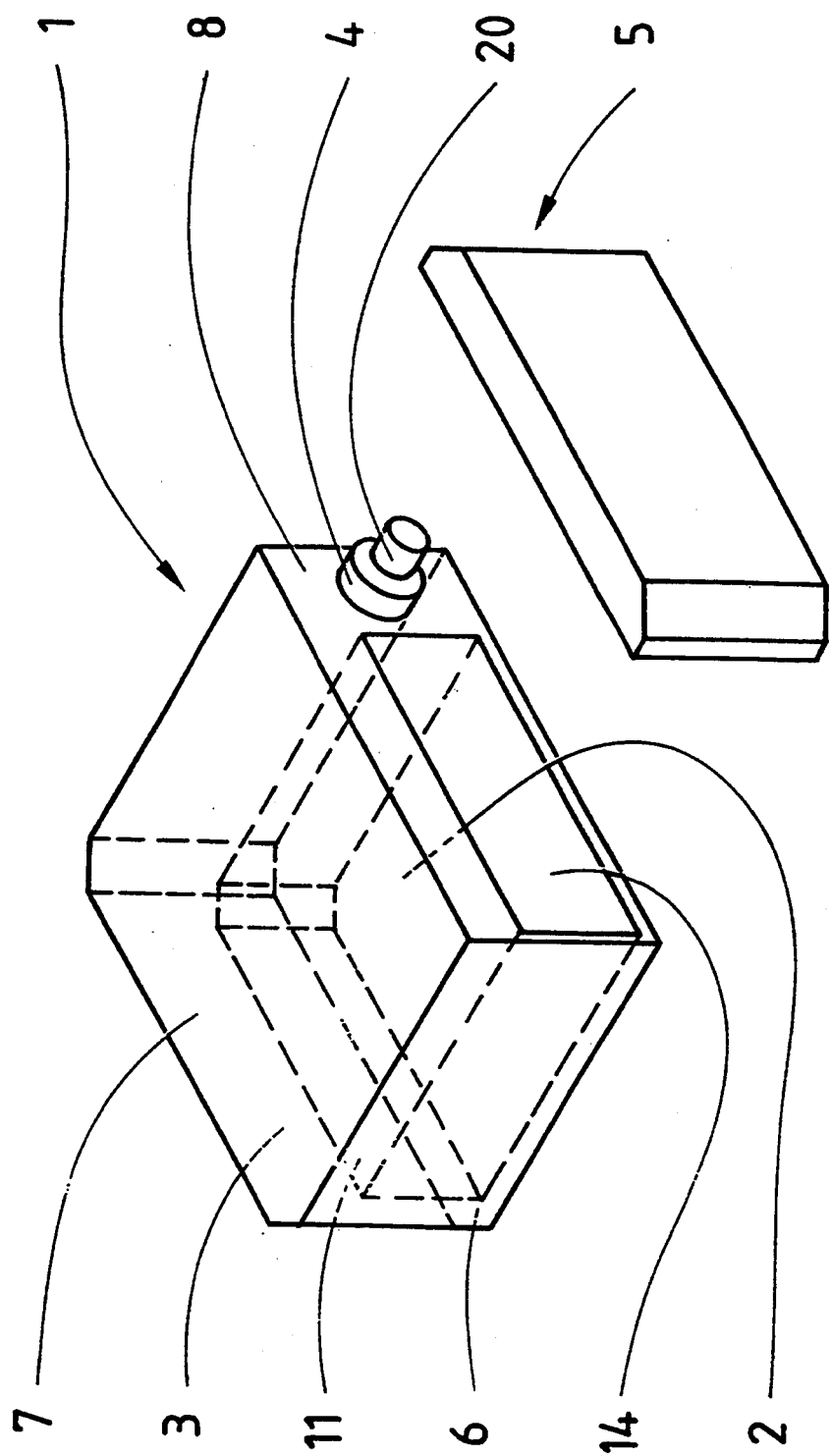
FIG. 1 is a container according to a preferred embodiment in a simplified perspective view in approximately actual size.
Figure 2:
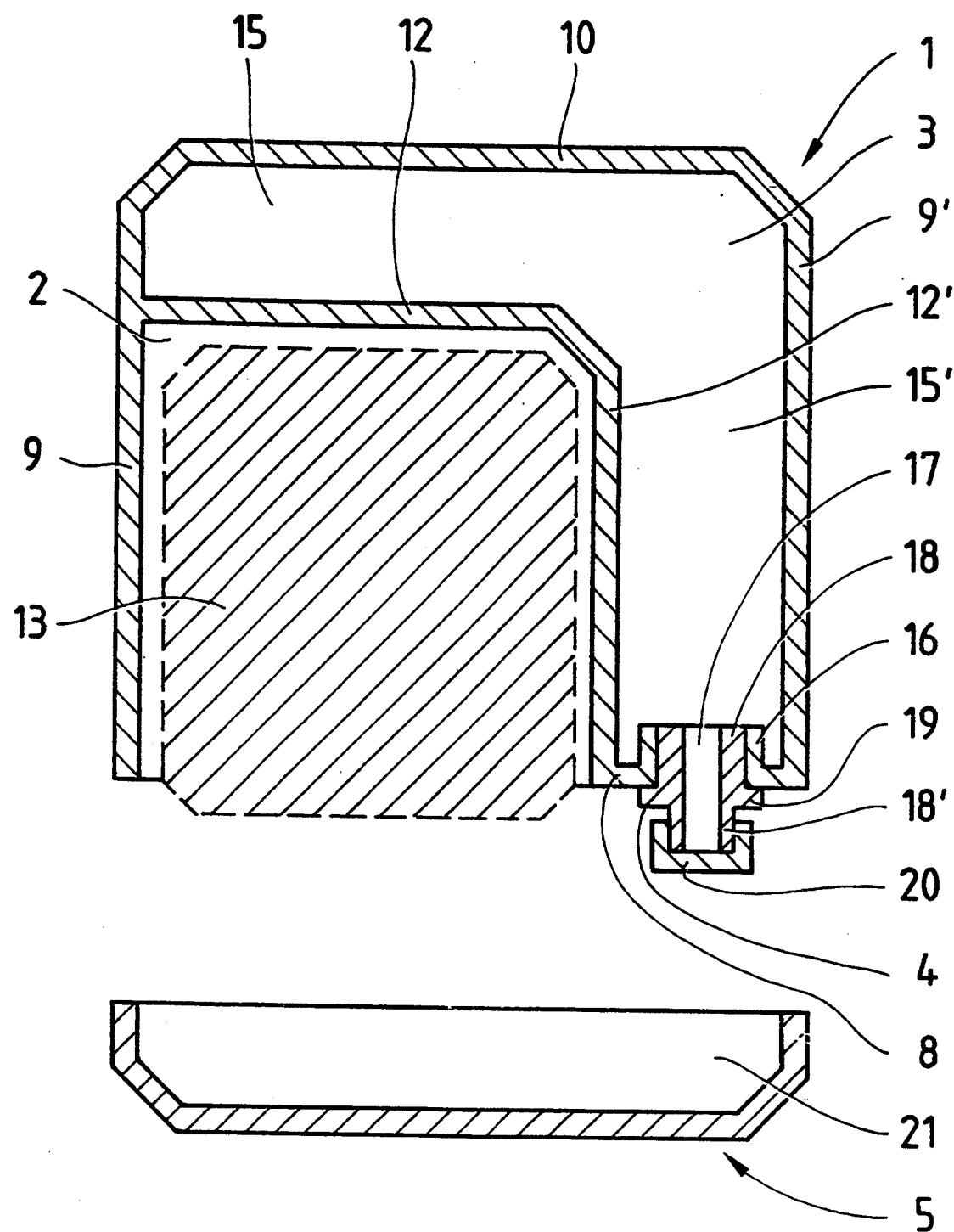
FIG. 2 illustrates the container of FIG. 1 in horizontal section.

Turning to FIGS. 1 and 2, the container consists of a base body 1 with a receptacle 2, a fluid chamber 3 and a metering connector 4 as well as a detachable cover 5.

The base body 1 of the container is composed of several plastic parts which have been produced by the ejection molding process and are welded together. The base body 1 is essentially formed from a bottom plate 6, a cover plate 7 with the same area, a front face 8, two side walls 9, 9' a rear wall 10, an intermediate plate 11 adjoining the side wall 9 and disposed between the bottom plate 6 and the cover plate 7, and two interior walls 12, 12' fastened on the intermediate plate 11.

A cuboid-shaped receptacle 2 for a contact lens etui 13 is provided in the interior of the base body 1. The contact lens etui 13 in the inserted state is indicated by dashed lines in FIG. 2. The receptacle 2 has an approximately square layout and is accessible through the opening 14 in the front face 8. The receptacle 2 is delimited by a portion of the bottom plate 6, a portion of the side wall 9, the two interior walls 12, 12' and the intermediate plate 11. In this case the dimensions of the receptacle 2 correspond to the dimensions of the contact lens etui 13 in such a way that the latter slightly projects out of the base body 1 when inserted and can be easily removed by the user.

The base body 1 encloses a fluid chamber 3 which adjoins the receptacle 2 for the contact lens etui 13. The fluid chamber 3 has an L-shaped cross section in a sectional view in respect to the front face 8 as well as in a sectional view in respect to the bottom plate 6 or to one of the side walls 9 or 9'. In this case the first leg 15 of the L lies parallel to the rear wall 10 and the second leg 15' of the L perpendicularly to the front face 8.

A metering connector 4 projects beyond the front face 8 of the base body 1, which extends into the fluid chamber 3 through a threaded opening 16 with a left-hand interior thread. This metering connector 4 is embodied as a twice stepped hollow cylinder 17. It has a first cylinder section 18 with a left-hand exterior thread, an adjacent flat support ring 19 and a second cylinder section 18' with a right-hand exterior thread of a lesser exterior diameter adjoining the support ring 19. In this case the first cylinder section 18 is completely screwed into the corresponding threaded opening 16 as far as the support ring 19. A closure cap 20, which is ribbed on the outside and has a right- hand interior thread, is screwed on the exterior thread of the second cylinder section 18'.

In both drawing figures the cover or lid 5, also made of plastic, is shown in the removed state. The cover 5 has a recess 21 facing the front face 8. The cover 5 be interlocked with the base body 1 by fastening means, not shown, so that in the attached position the front face 8 of the base body 1 and thus the receptacle 2 as well as the metering connector and the contact lens etui pushed into the receptacle 2 are completely covered. In the process, in the attached state of the cover 5, the recess 21 receives the part of the contact lens etui 13 projecting from the base body 1 as well as the metering connector 4, also extending from the base body 1, with the closure cap screwed on.

It will be understood that the above description of the present invention is susceptible to various modifications, changes and adaptations, and the same are intended to be comprehended within the meaning and range of equivalents of the appended claims.

What is claimed is:

1. A container for contact lenses and a supply of contact lens fluid, comprising
   a base body in the shape of a rectangular cuboid with a flat front face;
   a rectangular receptacle accessible from the front face for accommodating a removable contact lens etui;
   a cross-sectionally L-shaped fluid chamber partly surrounding the receptacle such that the two legs of the L enclose the receptacle;
   a metering connector disposed on the front face and connected with the fluid chamber; and
   a covering for the front face.

2. A container as defined in claim 1, further wherein
   a threaded opening with an interior thread is provided on the front face;
   the metering connector is a twice-stepped hollow cylinder making a transition from a first cylinder section to a second cylinder section via a flat support ring; wherein the second cylinder section has a lesser diameter than the first cylinder section;
   the first cylinder section and the second cylinder section each have respectively an exterior thread; and
   a closure cap is threadedly mounted on the second cylinder section.

3. A container as defined in claim 1, wherein the covering comprises a lid.

* * * * *